United States Patent
Lupescu

(10) Patent No.: US 9,734,006 B2
(45) Date of Patent: Aug. 15, 2017

(54) SYSTEM AND METHOD FOR ERROR DETECTION IN A CRITICAL SYSTEM

(71) Applicant: FREESCALE SEMICONDUCTOR, INC., Austin, TX (US)

(72) Inventor: Grigore G. Lupescu, Bucharest (RO)

(73) Assignee: NXP USA, Inc., Austin, TX (US)

( * ) Notice: Subject to any disclaimer, the term of this patent is extended or adjusted under 35 U.S.C. 154(b) by 95 days.

(21) Appl. No.: 14/945,861

(22) Filed: Nov. 19, 2015

(65) Prior Publication Data
US 2017/0083392 A1    Mar. 23, 2017

(30) Foreign Application Priority Data
Sep. 18, 2015   (RO) .............................. A 2015 00670

(51) Int. Cl.
*G06F 11/00* (2006.01)
*G06F 11/07* (2006.01)

(52) U.S. Cl.
CPC ........ *G06F 11/079* (2013.01); *G06F 11/0706* (2013.01); *G06F 11/0751* (2013.01)

(58) Field of Classification Search
CPC ............. G06F 11/0706; G06F 11/0721; G06F 11/0724; G06F 11/0751; G06F 11/079; G06F 11/1608; G06F 11/1629; G06F 11/1637; G06F 11/1641; G06F 11/1654; G06F 11/3013; G06F 11/3024
See application file for complete search history.

(56) References Cited

U.S. PATENT DOCUMENTS

| | | | |
|---|---|---|---|
| 4,698,785 A * | 10/1987 | Desmond | G06F 11/1637 701/14 |
| 4,926,427 A | 5/1990 | Remein | |
| 5,790,778 A | 8/1998 | Bush et al. | |
| 6,173,229 B1 * | 1/2001 | Fennel | G06F 11/1641 700/2 |

(Continued)

FOREIGN PATENT DOCUMENTS

EP    2159709 A1    3/2010

OTHER PUBLICATIONS

Dimitrov, M. et al., "Understanding Software Approaches for GPGPU Reliability," Proceedings of 2nd Workshop on General Purpose Processing on Graphics Processing Units, New York, NY; ISBN: 978-1-60558-517-8; Mar. 8, 2009; pp. 94-104.

*Primary Examiner* — Joshua P Lottich

(57) ABSTRACT

A system includes a processor having first and second processing units and a memory coupled to the processor. The memory includes processor executable code to implement an application to execute a first process to provide first application output information and to execute a second process to provide second application output information, a selector to provide a first indication that the first process is a critical process and a second indication that the second process is a non-critical process, and an application program interface (API) to run on the first processing unit. The API directs the processor to run the application on the second processing unit, executes the first process to provide first API output information in response to the first indication; determines if the first application output information matches the first API output information, and determines to not execute the second process in response to the second indication.

20 Claims, 7 Drawing Sheets

(56) References Cited

U.S. PATENT DOCUMENTS

| | | | |
|---|---|---|---|
| 6,820,213 B1* | 11/2004 | Somers | G06F 11/165 714/11 |
| 7,209,811 B1* | 4/2007 | Goricke | B61L 21/00 701/19 |
| 8,326,079 B2 | 12/2012 | Vans et al. | |
| 8,365,015 B1 | 1/2013 | Yu et al. | |
| 8,583,963 B2 | 11/2013 | Shao | |
| 8,692,836 B2 | 4/2014 | Schuette | |
| 8,707,110 B1 | 4/2014 | Shaeffer et al. | |
| 8,959,392 B2 | 2/2015 | Traskov et al. | |
| 9,612,922 B2* | 4/2017 | Geiger | G06F 11/1641 |
| 2006/0190702 A1* | 8/2006 | Harter | G06F 11/10 712/15 |
| 2007/0277023 A1* | 11/2007 | Weiberle | G06F 9/30181 712/229 |
| 2008/0162989 A1* | 7/2008 | Weiberle | G06F 11/1438 714/16 |
| 2009/0031161 A1* | 1/2009 | Weiberle | G06F 11/0715 714/2 |
| 2009/0055674 A1* | 2/2009 | Mueller | G06F 9/30181 713/375 |
| 2009/0193229 A1* | 7/2009 | Aegerter | G06F 11/1641 712/30 |
| 2009/0217092 A1* | 8/2009 | Weiberle | G06F 11/165 714/24 |
| 2010/0281485 A1* | 11/2010 | Ferch | G06F 9/4881 718/103 |
| 2011/0179308 A1* | 7/2011 | Pathirane | G06F 9/30189 714/37 |
| 2011/0302450 A1* | 12/2011 | Hickey | G06F 11/1641 714/17 |
| 2012/0023389 A1* | 1/2012 | Brewerton | G06F 11/1641 714/820 |
| 2013/0060526 A1* | 3/2013 | Geiger | G06F 11/1641 702/186 |
| 2013/0145214 A1 | 6/2013 | Provencher et al. | |
| 2013/0145482 A1* | 6/2013 | Ricci | G06F 9/54 726/28 |
| 2014/0181587 A1 | 6/2014 | Sridharan et al. | |
| 2015/0169427 A1* | 6/2015 | Cornes | G06F 11/1637 714/47.1 |

* cited by examiner

SYSTEM AND METHOD FOR ERROR DETECTION IN A CRITICAL SYSTEM

CROSS REFERENCE TO RELATED APPLICATION(S)

The present application claims priority to Romanian Patent Application No. RO A 2015 00670, entitled "SYSTEM AND METHOD FOR ERROR DETECTION IN A CRITICAL SYSTEM," filed on Sept. 18, 2015, the entirety of which is herein incorporated by reference.

FIELD OF THE DISCLOSURE

This disclosure generally relates to critical systems, and more particularly relates to a system and method for error detection in a critical system.

BACKGROUND

A critical system program provides the operation and control of a system, the failure of one or more portions of which may have highly undesirable consequences. Critical systems are used in a wide variety of areas, such as automotive and aircraft safety and control systems, aerospace navigation systems, power plant and power grid management systems, water supply and treatment systems, biomedical monitoring and control systems, business critical systems such as process controls and database systems, to name but a few. In any of these critical systems, the failure of one or more components of the system can result in serious consequences, from the loss of business data to the loss of human life.

Failures in a critical system can come in many forms. For example, a critical system can suffer the failure of a sensor, where the sensor either provides false data or provides no data. In either case, the false data can produce erroneous decisions related to the functions of the critical system, thereby increasing the risk of catastrophe. In another example, a critical system can suffer from the failure of a processing unit, either as a minor failure where the processing unit miscalculates a result which again leads to erroneous decisions, or as a major failure where the processing unit altogether ceases operation, thereby leaving the critical system completely non-operable. In yet another example, a critical system can suffer a critical software failure either due to software bugs or insufficient validation and quality control, or due to corruption of the software through storage or transmission errors.

A critical system can employ various techniques to detect failures and errors. In particular, a critical system can employ dedicated redundant hardware components, such as additional or backup sensors, so that the failure of a single hardware component does not result in the complete loss or corruption of the data. Also, a critical system can employ redundant processing resources, such as parallel processing systems, that either operate on independent data or that operate on the same data. In either case, the processing resources compare the results of the parallel processing paths to verify each calculation and ensure the safety of the critical system. Further, a critical system can operate to mitigate the impact of detected errors and failures. In particular, a critical system can include robust error handling, decision and risk logic, or the like, to ensure that, when an error is detected, the critical system nevertheless does not experience a catastrophic failure.

However the cost of a robust critical system can be prohibitive, both in terms of capital cost for the redundant components of the critical system, and in terms of the development and validation time to ensure the robustness and failure mitigation capabilities of the critical system. Thus there remains a need for a more cost-effective solution for making and developing critical systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present invention are shown and described with respect to the drawings presented herein, in which.

The use of the same reference symbols in different drawings indicates similar or identical items.

DETAILED DESCRIPTION OF DRAWINGS

Figure 1:
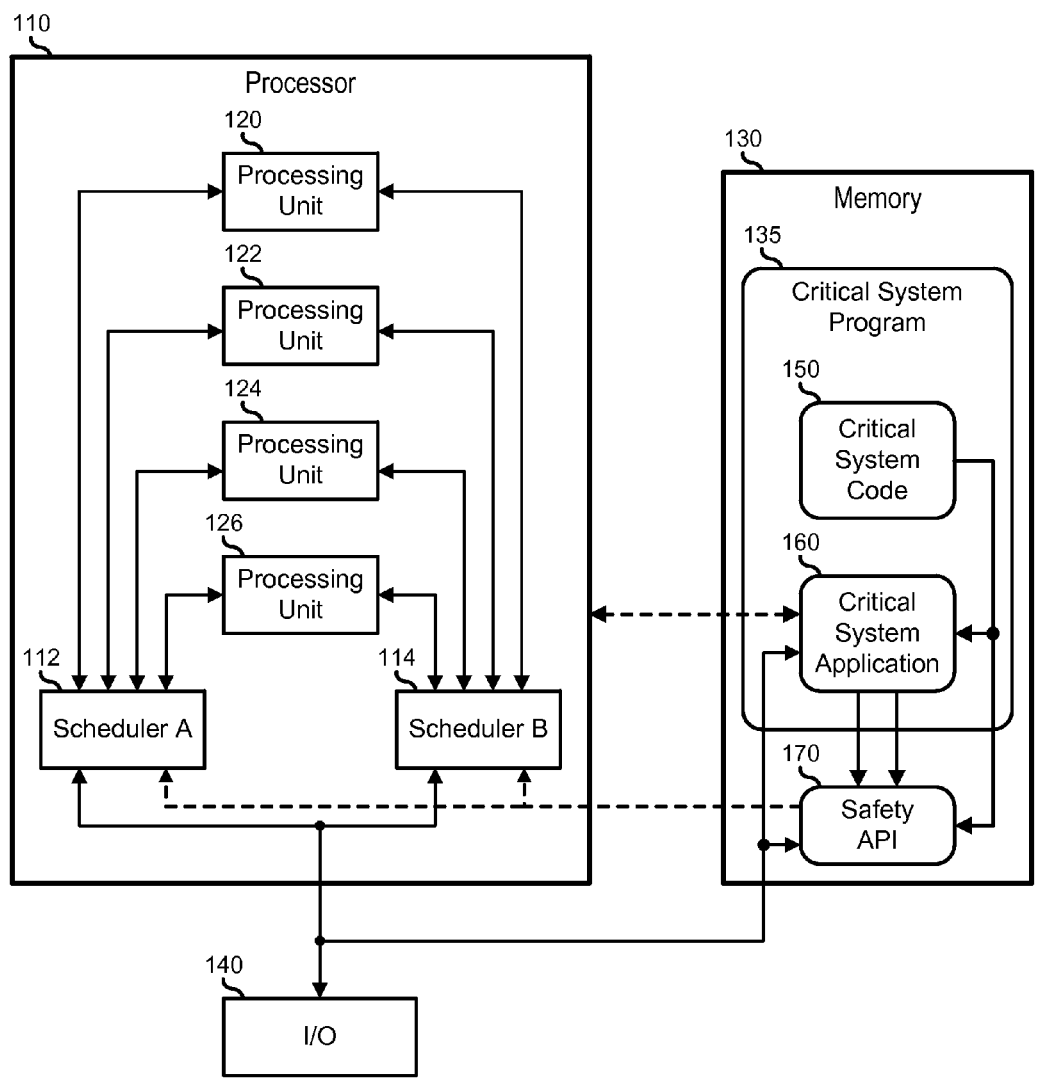
FIG. 1 is a block diagram illustrating a critical system according to an embodiment of the present disclosure.

A critical system in accordance with embodiments of the present invention includes a critical system program that runs on selected processing units of a processor to provide the safety critical functions of the critical system. The critical system program includes a critical system application that receives input information from memory, I/O devices, and sensors, executes critical system code that processes the input information into output information that represents control output data that is provided to the memory, the I/O devices, and control devices of the critical system. The critical system application includes critical processes and non-critical processes. For example, where the critical system application provides safety critical functions and features of an automobile, the critical processes can include motor control functions, braking functions, security functions, and the like, and the non-critical processes can include entertainment system functions, climate control functions, communications functions, and the like.

The critical system also includes a safety application program interface (API) that runs on different processing units of the processor than the critical system application. The safety API identifies the processing units that the critical system application and the safety API each use in their respective operations, and monitors the critical processes of the critical system application. However, unlike a typical redundant system that monitors both critical processes and non-critical processes of a critical system, the safety API does not monitor the non-critical processes. As such, the safety API receives selected input information and critical system code associated with the critical processes, performs redundant processing on the selected input information and critical system code, provides output information associated with the selected input information, and determines if the output information from the safety API matches the output information associated with the critical processes from the critical system application. If the output information from the safety API does not match the output information from the critical system application, then an error signal is provided to indicate that there has been an error in the processing of the critical process.

When the safety API determines that the output information from the safety API does not match the output information from the critical system application, the safety API reallocates different combinations of the processing units to the critical system application and to the safety API, and reruns the segment of the critical system code that produced the mismatch on the different combinations of the processing units. The safety API then compares the results of the different runs to deterministically identify whether or not the original mismatch can be traced to a particular processing unit. In the event that the safety API identifies a failing processing unit, an indication is provided that the failing processing unit has been identified.

Further, when the critical system application is executing non-critical processes, the safety API allocates the processing units from the safety API to the critical system application to speed up the operation of the non-critical processes. Then, when another critical process is being executed, the safety API reallocates processing units to the safety API, so that the safety API can perform redundant processing on the critical process. Thus the critical system of the present invention provides the safety of redundant processing when needed, without the necessity of providing the greater number of processing units that would be needed to implement a fully redundant processing system.

FIG. 1 illustrates an embodiment of a critical system 100 including a processor 110, a memory system 130, and an input/output (I/O) device 140. Memory 130 includes a critical system program 135 and a safety API 170. Critical system program 135 includes critical system code 150 and a critical system application 160. Critical system 100 represents a system that can be utilized to implement the critical system of the present invention. As such, critical system 100 operates to execute code to perform the processing functions and features of the critical system. In particular, the code can be stored in memory 130, and retrieved and executed by processor 110. The code can include calls to retrieve information from I/O 140, such as sensor data, and can include data writes to send information to the I/O, such as control information. In addition, I/O 140 can represent typical input and output devices, such as a keyboard/mouse, a touch screen device, a monitor, or another such device.

Processor 110 includes schedulers 112 and 114, and processing units 120, 122, 124, and 126. Processor 110 operates to execute code to perform computing operations, including the instantiation and operation of critical system application 160 and safety API 170, execution of critical system code 150 that provides the critical functions and features of critical system 100, and other applications, processes, or programs, as needed or desired. In particular, processor 110 operates to handle multiple computing operations that can be scheduled by schedulers 112 and 114 to be executed on one or more of processing units 120, 122, 124, and 126. An example of a computing operation includes a program or application that runs as a single task on a single processing unit 120, 122, 124, or 126, a program or application that runs as multiple tasks on one or more of the processing units, a task that runs as multiple threads on one or more of the processing units, or another operation, as needed or desired.

As such, schedulers 112 and 114 operate to allocate one or more of processing units 120, 122, 124, and 126 to the purpose of executing computing operations on processor 110. Here, schedulers 112 and 114 can include queues for storing multiple computing operations, and the schedulers operate to identify priority levels for the multiple computing operations, to determine which processing unit 120, 122, 124, or 126 to utilize for the execution of the computing operations, and when the selected processing unit is to execute the scheduled computing operation.

Figure 2:
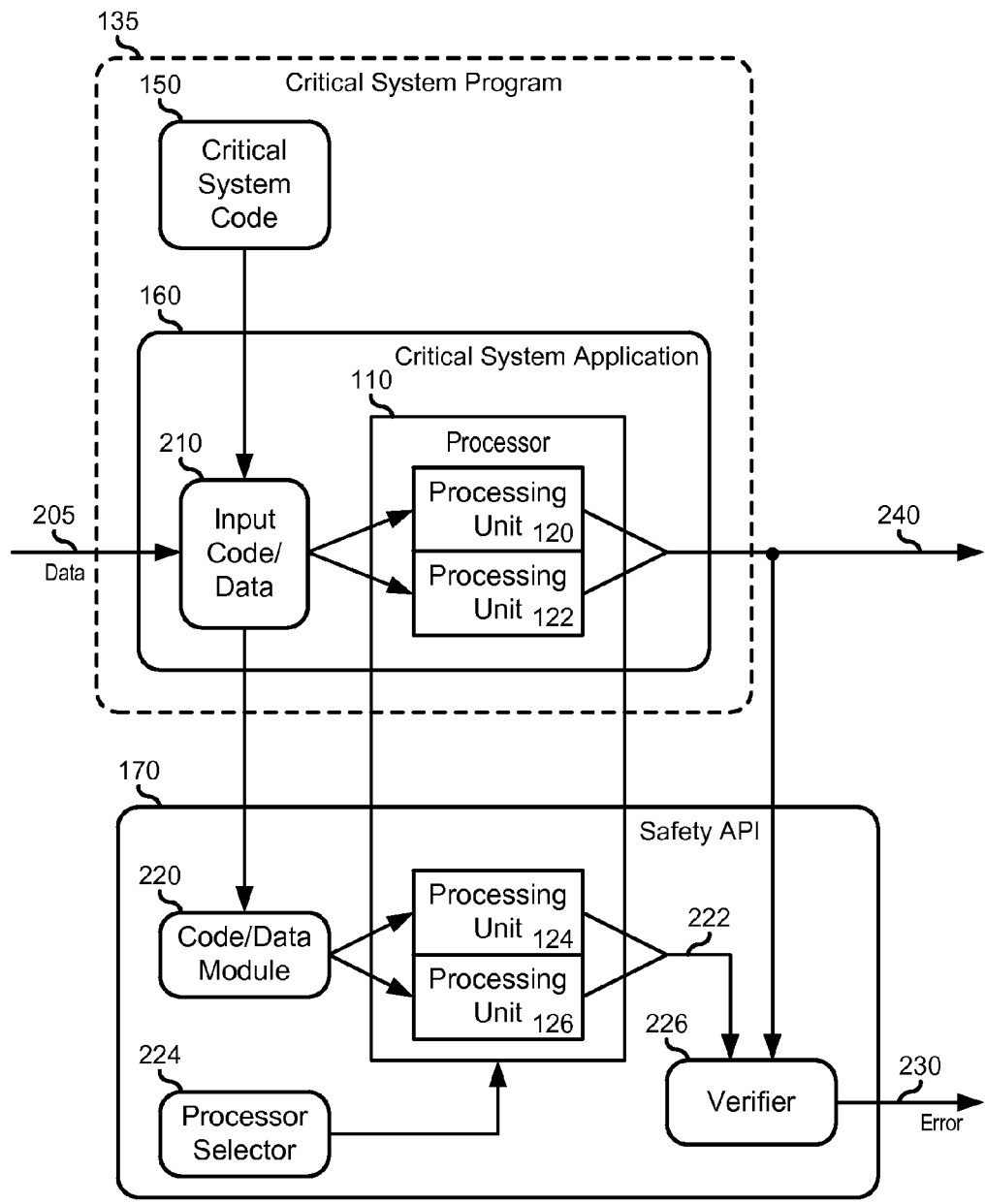
FIGS. 2 and 3 are block diagrams illustrating a critical system implemented on the processing device of FIG. 1.

FIG. 2 illustrates a particular instantiation of critical system 100 showing a particular allocation of critical system application 160 and of safety API 170 amongst the processing units of processor 110. Critical system application 160 includes an input code/data module 210 that receives critical system code 150 and input information 205 that is processed by processing units 120 and 122 to provide output information 240. Input information 205 represents data received by critical system application 160 from memory system 130 or from I/O device 140, and can include sensor data, user input data, or other input information, as needed or desired. Output information 240 represents control output data from critical system application 160 that is provided to memory system 130 or to I/O device 140, and can include control commands, user output data, or other output information, as needed or desired. In particular, output information 240 provides a checkpoint for verifying the operation of critical system application 160, as described below.

Safety API 170 includes an input code/data module 220, a processing unit selector 224, and a verifier 226. Input code/data module 220 receives some or all of critical system code 150 and input information 205 from input code/data module 210. The selected critical system code and input information is processed by processing units 124 and 126 to provide output information 222 to verifier 226. Output information 240 from critical system application 160 is also provided to verifier 226. Verifier 226 determines if the execution of critical system code 150 on respective processing units 120 and 122, and on processing units 124 and 126 resulted in the same output information by determining if output information 222 matches output information 240. If output information 212 and output information 222 are determined by verifier 226 to include different information, then an error signal 230 is provided from the verifier to indicate that there has been an error in the processing of critical system code 150. Here, when an error is detected, critical system 100 operates to determine whether the error can be attributed to a hardware error at one or more of processing units 120, 122, 124, and 126, as described further, below.

In a particular embodiment, critical system 100 operates in a monitoring mode, such that input code/data module 220 monitors all of input information 205 and all of critical system code 150. Here, input code/data module 220 selects subsets of input information 205 and portions of critical system code 150 to receive from input code/data module 210 for processing by processing units 124 and 126. Input code/data module 220 selects input information 205 and portions of critical system code 150 that are associated with the critical processes of critical system 100. For example, input code/data module 220 can detect a critical process when a portion of critical system code 150 is received from a particular memory storage location, or has a predetermined priority level, or the like, or when input information 205 is received from a particular input device, or from a particular port or memory location, or the like. In this embodiment, by virtue of input code/data module 220 having selected subsets of input information 205 and portions of critical system code 150, subsets of output information 222 are available for comparison with corresponding subsets of output information 240.

In another embodiment, critical system 100 operates in a directed mode, such that input code/data module 210 monitors all of input information 205 and all of critical system code 150. Here, input code/data module 210 selects subsets of input information 205 and portions of critical system code 150 to send to input code/data module 220 for processing by processing units 124 and 126. Input code/data module 210 selects input information 205 and portions of critical system code 150 that are associated with only critical processes to be sent to input code/data module 220. Input code/data module 210 can detect a critical process similarly to how input code/data module 220 detects critical processes in the monitoring mode, as described above. In this embodiment, as with the monitoring mode, by virtue of input code/data module 220 receiving selected subsets of input information 205 and portions of critical system code 150, subsets of output information 222 are available for comparison with corresponding subsets of output information 240.

In either the monitoring mode or the directed mode, when non-critical processes of critical system application 160 are being executed, processing units 124 and 126 can be scheduled to perform other tasks of critical system 100. In particular, processor selector 224 operates to identify one or more of processing units 120, 122, 124, and 126 to be utilized in the operation of critical system application 160 and safety API 170. As such, processor selector 224 operates in conjunction with schedulers 112 and 114, as shown in FIG. 1, to schedule critical system application 160 and safety API 170 onto the identified processing units 120, 122, 124, and 126. Thus, as here illustrated, processor selector 224 has identified processing units 120 and 122 for use by critical system application 160, and processing units 124 and 126 for use by safety API 170. In other implementations, processor selector 224 identifies only one of processing units 120, 122, 124, or 126, other combinations of two of the processing units, or combinations of three of the processing units for safety API 170 to utilize, as needed or desired. Processor selector 224 operates by directing one or more of schedulers 112 and 114 to schedule the selected input information and critical system code 150 for execution on the selected one or more of processing units 120, 122, 124, and 126, as needed or desired. Processor selector 224 invokes the actions of one or more of schedulers 112 and 114 to schedule the selected operations onto the selected processing units.

Figure 3:
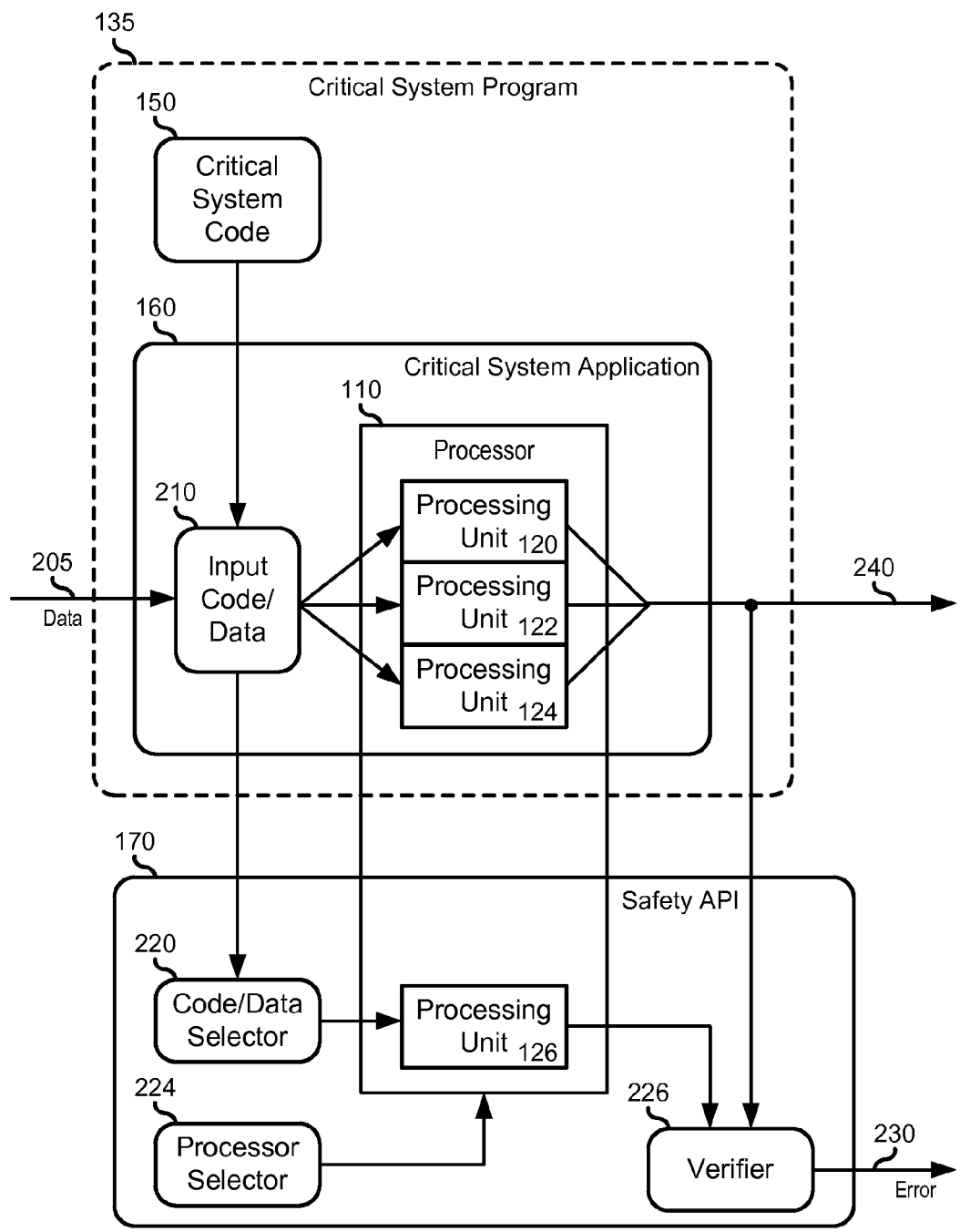

FIG. 3 illustrates critical system 100 configured in a different implementation. As noted above, output information 240 provides a checkpoint for verifying the operation of critical system application 160. Here, processing units 120, 122, and 222 are allocated to critical system application 170, and processing unit 126 is allocated to safety API 170. Here, when an error is detected, critical system 100 operates to determine that the error is a hardware error because both critical system application 160 and safety API 170 execute common critical system code 150 on the common input information 205, and can determine whether the error is due to the failure of one or more of processing units 120, 122, 124, and 126, as described further, below.

In particular, in the embodiment of FIG. 2, where processing units 120 and 122 are ascribed to critical system application 160 and processing units 124 and 126 are ascribed to safety API 170, when an error is detected, it is immediately indeterminate as to whether the error is the result of a hardware error in one of processing units 120, 122, 124, or 126, or whether the error is the result of a software issue. As such, when an error is detected, critical system 100 operates to re-run the segment of critical system code 150 that experienced the failure a second time on different combinations of processing units 120, 122, 124, and 126. Then, if the failure does not reoccur, critical system 100 can infer that the original failure was the result of either a glitch or a non-recurring software error, and processing can proceed with the programmed execution until such time as another error occurs. However, if the failure persists, critical system 100 can proceed to determine whether the failure is the result of a hardware error. In particular, critical system 100 can isolate each of processing units 120, 122, 124, and 126 in safety API 170, such as where processing unit 126 is isolated in the safety API as illustrated in FIG. 3. In another implementation, critical system application 160 is configured to execute critical system code 150 using only a single processing unit 120, 122, or 124. In this way, safety API 170 can directly compare the resulting output information for each pair of processing units to isolate the failing processing unit.

Figure 4:
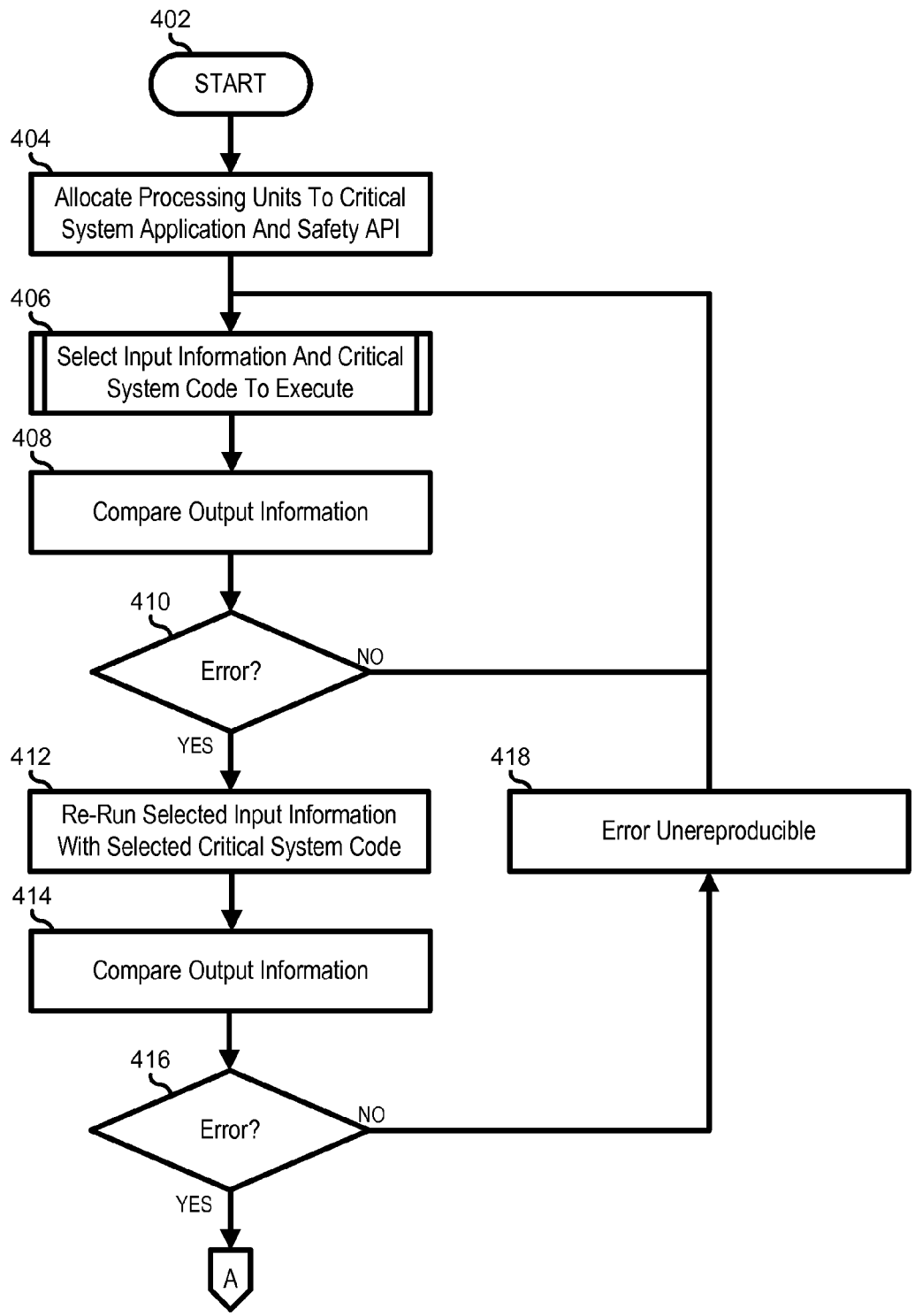
FIGS. 4 and 5 are a flowchart illustrating a method of implementing a safety critical system according to an embodiment of the present disclosure.
Figure 5:
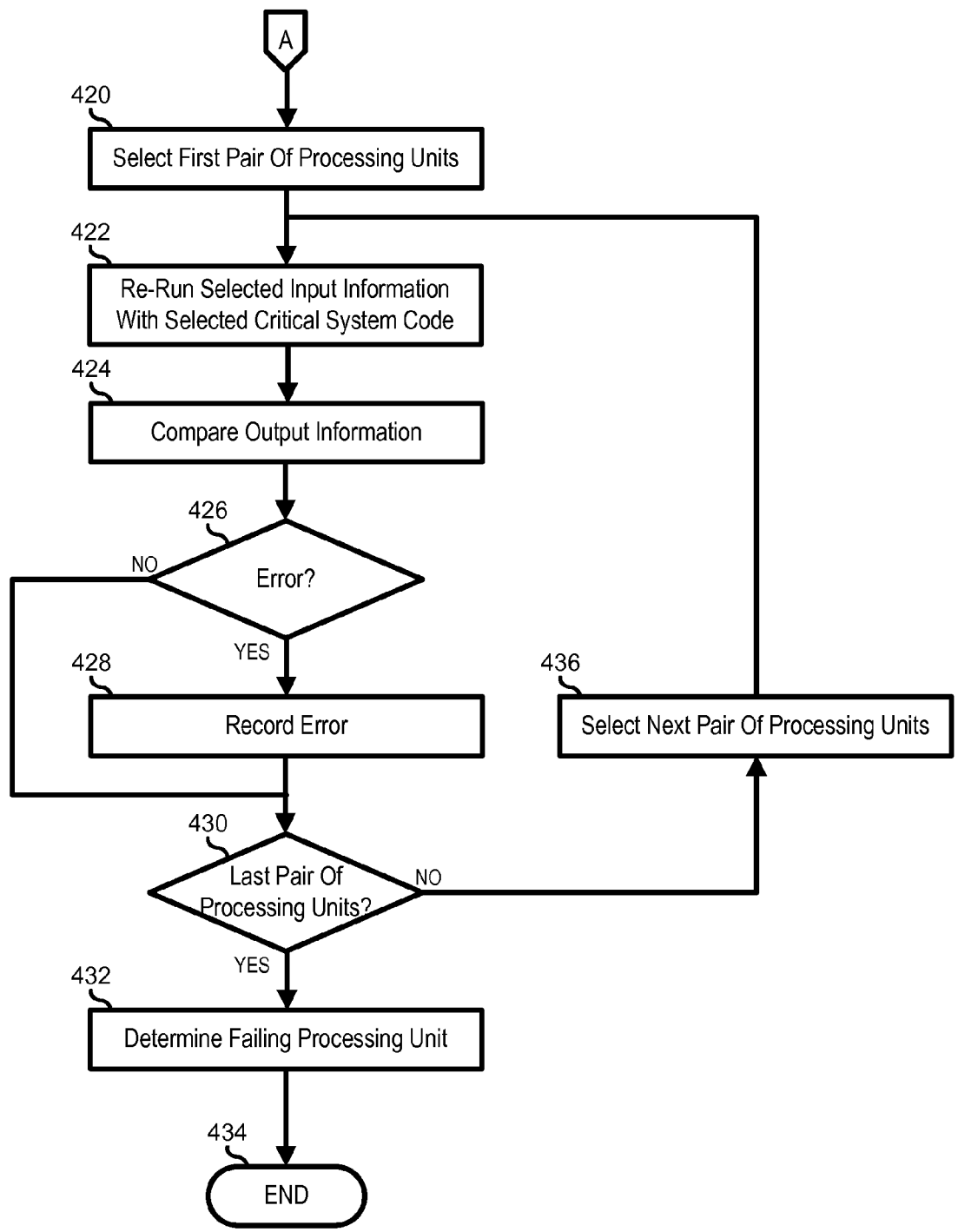

FIGS. 4 and 5 illustrate a method of implementing a safety API, starting at block 402. Processing units of a critical system are allocated to a critical system application and to a safety API in block 404. For example, processing units 120 and 122 of critical system 100 can be allocated to the use of critical system application 160, and processing units 124 and 126 can be allocated to the use of safety API 170. Input information and critical system code is selected for execution in block 406. Here, input code/data module 220 can receive some or all of input information 205 and some or all of critical system code 150 from input code/data module 210 to be executed on the selected processing units. Whether particular information is processed by the safety API can be determined by the safety API or by the critical system application. For example, critical system 100 can operate in a monitoring mode where input code/data module 220 monitors all of input information 205 and all of critical system code 150 and selects subsets of input information 205 and portions of critical system code 150 to receive from input code/data module 210 for processing by processing units 124 and 126, or critical system 100 can operate in a directed mode where input code/data module 210 monitors all of input information 205 and all of critical system code 150 and selects subsets of input information 205 and portions of critical system code 150 to send to input code/data module 220 for processing by processing units 124 and 126.

Figure 6:
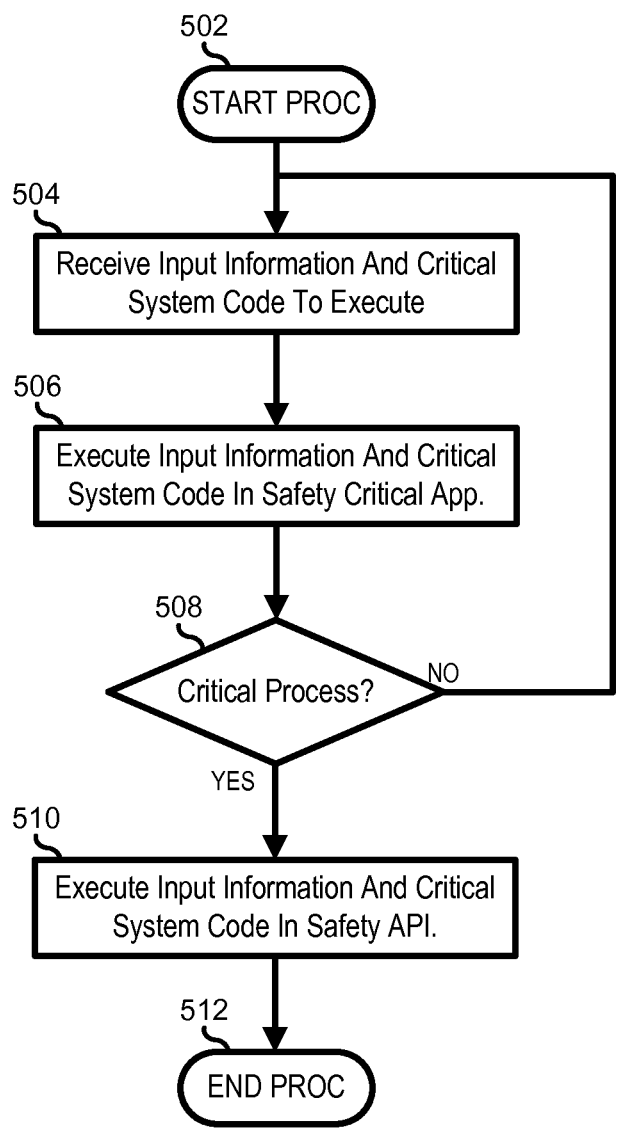
FIG. 6 is a flowchart illustrating a method of determining input information and critical system code for execution by a safety API according to an embodiment of the present disclosure.

In a particular embodiment, a method of determining input information and critical system code for execution by a safety API is illustrated in FIG. 6. The method can be performed as optional procedure in selecting input information and critical system code for execution by a critical system application and a safety API, as disclosed in block 406 of FIG. 4. In particular, the method is associated with embodiments where a critical system operates in a monitoring mode or a directed mode, as described above, where the safety API only executes input information and critical system code associated with critical processes. The method starts at block 502. Input information and critical system code is selected for execution in block 406. Input information and critical system code is received to be executed in block 504. The retrieved input information and critical system code is executed in the safety critical application in block 506. A decision is made as to whether or not the input information and critical system code is associated with a critical process in decision block 508. If not, the "NO" branch of decision block 508 is taken and the method returns to block 504 where input information and critical system code is selected for execution. If the input information and critical system code is associated with a critical process, the "YES" branch of decision block 508 is taken, the retrieved input information and critical system code is executed in the safety API in block 510, and the method ends in block 512.

Continuing with the method of FIGS. 4 and 5, the output information of the critical system application is compared to the output information of the safety API in block 408. For example, output information 240 can be compared to output information 222 by verifier 226. A decision is made as to whether or not an error in the comparison of the output information with the verification output information is detected in decision block 410. If not, the "NO" branch of decision block 410 is taken and the method returns to block 406 where new input information and critical system code is selected for execution by the critical system. If an error in the comparison of the output information with the verification output information is detected, the "YES" branch of decision block 410 is taken, and selected input information and the the selected critical system code is re-run by the critical system application and the safety API in block 412 as currently configured, e.g., in the same configuration as the error first occurred, and the output information of the critical system application is re-compared to the verification output information of the safety API in block 414.

A second decision is made as to whether or not an error in the re-comparison of the output information with the verification output information is detected in decision block 416. If not, the "NO" branch of decision block 416 is taken, the original error is determined to be unreproducible in block 418, and the method returns to block 406 where new input information and critical system code is selected for execution by the critical system. If an error in the re-comparison of the output information with the verification output information is detected, the "YES" branch of decision block 416 is taken and a first pair of processing units is selected for processing the selected critical system code and the selected input information by the critical system application and the safety API in block 420. For example, processor selector 224 can identify one of processing units 120, 122, 124, or 126 on which to execute critical system application 160, and can identify another processing unit on which to execute safety API 170. Thus, a different configuration will be tested during the next time the critical code is executed.

The selected input information and the selected critical system code is executed by the reconfigured critical system application and the reconfigured safety API in block 422. The output information of the reconfigured critical system application is compared to the verification output information of the reconfigured safety API in block 424. A third decision is made as to whether or not an error in the comparison of the output information with the verification output information is detected in decision block 426. If not, the "NO" branch of decision block 426 is taken and the method proceeds to decision block 430, as described below. If an error in the re-comparison of the output information with the verification output information is detected, the "YES" branch of decision block 426 is taken, the error is recorded as being associated with the first pair of processing units in block 428, and the method proceeds to decision block 430.

A decision is made as to whether or not the selected pair of processing units is the last pair of processing units in decision block 430. If not, the "NO" branch of decision block 430 is taken, a next pair of processing units is selected in block 436, and the method returns to block 422 where the selected input information is re-run on the selected critical system code by the newly reconfigured critical system application and the newly reconfigured safety API. If the selected pair of processing units is the last pair of processing units, the "YES" branch of decision block 430 is taken, the failing processing unit is determined in block 432, and the method ends in block 434. For example, where a particular processing unit consistently yields errors, the particular processing unit can be determined to be the failing processing unit.

Figure 7:
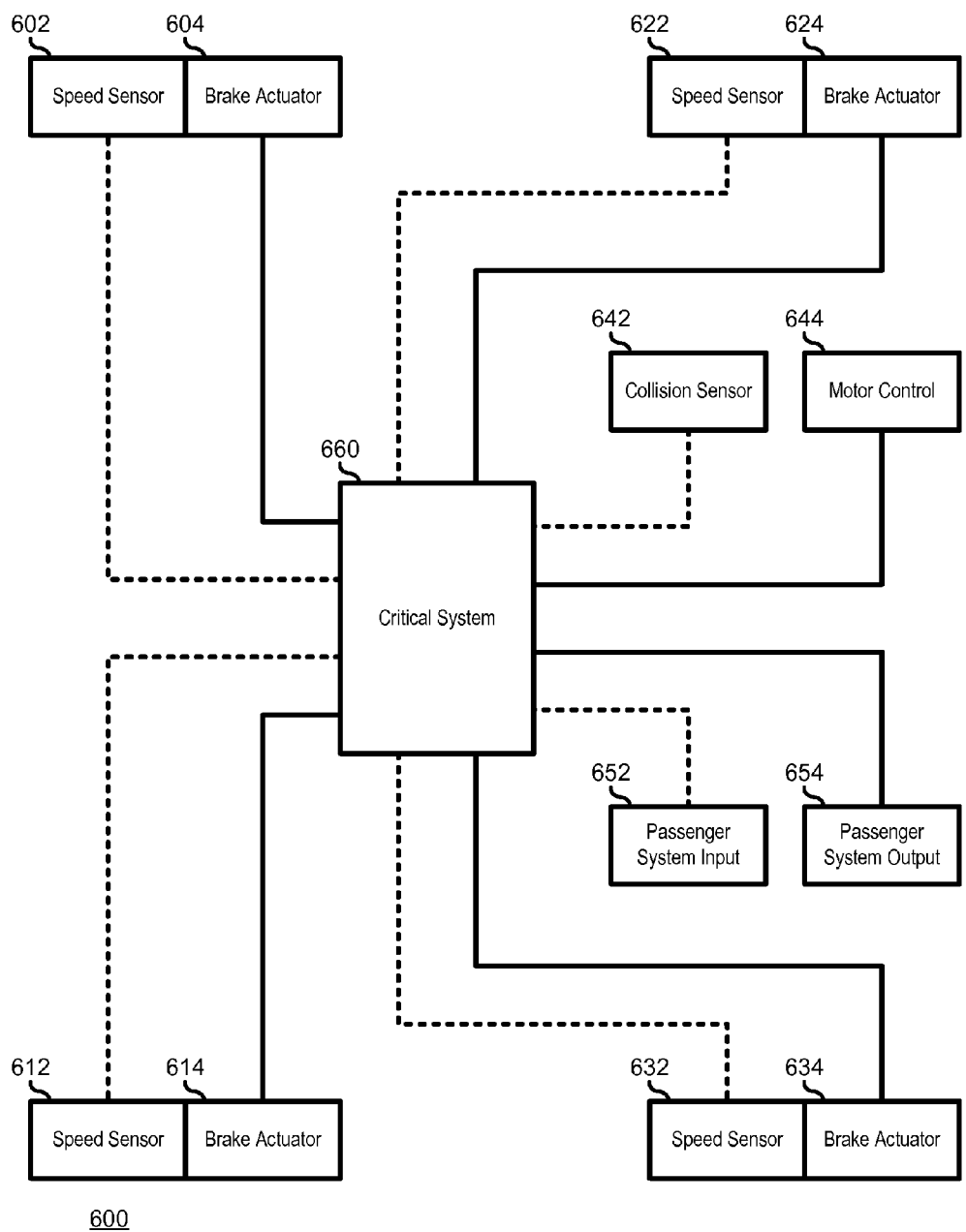
FIG. 7 is a block diagram illustrating a generalized automotive system including a safety critical system according to an embodiment of the present disclosure.

FIG. 7 is a block diagram illustrating a generalized automotive system 600 including a safety critical system according to an embodiment of the present invention. Automotive system 600 represents a simplified automobile sensor and control system and includes speed sensors 602, 612, 622, and 632 and brake actuators 604, 614, 624, and 634 that are located at the wheels of an automobile, a collision sensor 642, a motor control 644, passenger system input 652, passenger system output 654, and a critical system 660.

Speed sensors 602, 612, 622, and 632 operate to detect a respective wheel speed and to provide the wheel speed information to critical system 644. The wheel speed information can be utilized in vehicle speed control operations including cruise control and the like, vehicle braking operations including anti-lock braking and the like, and other vehicle operations, as needed or desired. As such, speed sensors 602, 612, 622, and 632 represent input information that is provided to critical system 650.

Brake actuators 604, 614, 624, and 634 operate to direct braking effort to the associated wheels during normal braking operations, anti-lock braking operations, and the like. As such, brake actuators 604, 614, 624, and 634 represent output information that is provided from critical system 650.

Collision sensor 642 operates to detect when a collision between the vehicle and another object is either imminent or already occurring. Thus, collision sensor 642 provides collision information to critical system 650 for speed reduction operations to avoid a collision, for airbag deployment in a collision situation, or for other operations as needed or desired. As such, collision sensor 642 represents input information that is provided to critical system 650.

Motor control 644 operates to manage the functions of the vehicle motor during acceleration and deceleration operations, cruise operations, idle operations, or other operations as needed or desired. As such, motor control 644 represent output information that is provided from critical system 650.

Passenger system input 652 and passenger system output 654 operate to manage functions of the vehicle that are related to passenger comfort and entertainment, and can include a media system, a vehicle heating and air conditioning system, a seat back and steering wheel adjustment system, or other passenger systems of the vehicle.

Critical system 650 is similar to critical system 100 and includes a critical system similar to critical system 100. Critical system 660 operates to receive input information from speed sensors 602, 612, 622, and 632, from collision sensor 642, and from passenger system input 652, to perform operations on the input information by executing critical system code to derive output information that is provided to brake actuators 604, 614, 624, and 634, to motor control 644, and to passenger system output 654, to provide the safe operation of the vehicle. In executing the critical system code, critical system 650 implements a critical system application similar to critical system application 160, and a safety API similar to safety API 170, as described above. In particular, the operations related to speed sensors 602, 612, 622, and 632, collision sensor 642, brake actuators 604, 614, 624, and 634, and motor control 644 can be critical processes of automotive system 600, and operations related to passenger system input 652 and passenger system output 654 can be non-critical processes of the automotive system.

For the purpose of this invention, an API is a set of routines, protocols, and rules that define an interface through which applications can to interact with each other or with hardware.

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures.

It will be appreciated that the devices disclosed herein can be implemented in various manners using various types of memory. In particular, the application of the critical systems as described herein, are not limited to applications in the disclosed embodiments, but can be applied in other instances of critical systems.

In this document, relational terms such as "first" and "second", and the like, may be used solely to distinguish one entity or action from another entity or action without necessarily requiring or implying any actual such relationship or order between such entities or actions. The terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

The term "another", as used herein, is defined as at least a second or more. The terms "including", "having", or any variation thereof, as used herein, are defined as comprising. The term "coupled", as used herein with reference to electro-optical technology, is defined as connected, although not necessarily directly, and not necessarily mechanically.

The terms "assert" or "set" and "negate" (or "deassert" or "clear") are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

As used herein, the term "bus" is used to refer to a plurality of signals or conductors that may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

As used herein, the term "machine-executable code" can refer to instructions that can be provided to a processing device and can be executed by an execution unit. The machine-executable code can be provided from a system memory, and can include a system BIOS, firmware, or other programs. In addition, machine-executable code can refer to microcode instructions that can be used by a processing device to execute instructions, and can be provided by a microcode memory of the processing device.

Other embodiments, uses, and advantages of the invention will be apparent to those skilled in the art from consideration of the specification and practice of the invention disclosed herein. The specification and drawings should be considered exemplary only, and the scope of the invention is accordingly intended to be limited only by the following claims and equivalents thereof.

What is claimed is:

1. A system, comprising:
a processor including a first processing unit and a second processing unit; and
a memory coupled to the processor, wherein the memory includes code executable by the processor to implement:
an application configured to execute a first process to provide first application output information and to execute a second process to provide second application output information;
a selector configured to provide a first indication that the first process is a critical process of the system and to provide a second indication that the second process is a non-critical process of the system; and
an application program interface (API) configured to run on the first processing unit, to direct the processor to run the application on the second processing unit, to execute the first process to provide first API output information in response to the first indication; to determine if the first application output information matches the first API output information, and to determine to not execute the second process in response to the second indication.

2. The system of claim 1, the API being further configured to:
provide a third indication if the first application output information does not match the first API output information.

3. The system of claim 1, the API being further configured, if the first application output information does not match the first API output information, to:
execute the first process to provide second API output information;
determine if the first application output information matches the second API output information; and
provide a third indication if the first application output information does not match the second API output information.

4. The system of claim 1, the processor further including a third processing unit, and the API being further configured to:

launch an instantiation of the application on the third processing unit, the instantiation of the application to execute the first process to provide second application output information; and determine if the second application output information matches the first application output information and the first API output information.

5. The system of claim 4, the API being further configured to:

identify the first processing unit as a failing processing unit when the first application output information does not match the second application output information and the second output information matches the first API output information.

6. The system of claim 4, the API being further configured to:

identify the second processing unit as a failing processing unit when the first application output information matches the second application output information and the second application output information does not match the first API output information.

7. The system of claim 1, the API being further configured, in response to the second indication, to:

reallocate the first processing unit to the application such that the application executes the second process using the first and second processing units.

8. The system of claim 1, wherein the application comprises the selector.

9. The system of claim 1, wherein the API comprises the selector.

10. A method, comprising:

executing, by an application, a first process to provide first application output information;

executing, by the application, a second process to provide second application output information;

providing, by a selector, a first indication that the first process is a critical process of the system;

providing, by the selector, a second indication that the second process is a non-critical process of the system;

directing, by an application program interface (API) running on a first processor of a system, a second processor of the system to run the application;

executing, by the API, the first process to provide first API output information in response to the receiving the first indication;

determining, by the API, if the first application output information matches the first API output information; and determining, by the API, to not execute the second process in response to receiving the second indication.

11. The method of claim 10, further comprising:

providing, by the API, a third indication if the first application output information does not match the first API output information.

12. The method of claim 10, wherein, if the first application output information does not match the first API output information, the method further comprises:

executing, by the API, the first process to provide second API output information;

determining, by the API, if the first application output information matches the second API output information; and providing, by the API, a third indication if the first application output information does not match the second API output information.

13. The method of claim 10, further comprising:

launching, by the API, an instantiation of the application on a third processor of the system;

executing, by the instantiation of the application, the first process to provide second application output information; and determining, by the API, if the second application output information matches the first application output information and the first API output information.

14. The method of claim 13, further comprising:

identifying, by the API, the first processing unit as a failing processing unit when the first application output information does not match the second application output information and the second output information matches the first API output information.

15. The method of claim 13, further comprising:

identifying, by the API, the second processing unit as a failing processing unit when the first application output information matches the second application output information and the second application output information does not match the first API output information.

16. The method of claim 10, wherein, in response to the second indication, the method further comprises:

reallocating, by the API, the first processor to the application such that the application executes the second process using the first and second processors.

17. An automotive system, comprising:

a sensor device;

a control device;

an input device;

an output device; and a critical system, including:

a processor including a first processing unit and a second processing unit; and a memory coupled to the processor, wherein the memory includes code executable by the processor to implement:

an application configured to execute a first process to provide first application output information and to execute a second process to provide second application output information;

a selector configured to provide a first indication that the first process is a critical process of the system and to provide a second indication that the second process is a non-critical process of the system; and an application program interface (API) configured to run on the first processing unit, to direct the processor to run the application on the second processing unit, to execute the first process to provide first API output information in response to the first indication; to determine if the first application output information matches the first API output information, and to determine to not execute the second process in response to the second indication.

18. The automotive system of claim 17, the API being further configured to:

provide a third indication if the first application output information does not match the first API output information.

19. The automotive system of claim 17, the API being further configured, if the first application output information does not match the first API output information, to:

execute the first process to provide second API output information;

determine if the first application output information matches the second API output information; and provide a third indication if the first application output information does not match the second API output information.

20. The automotive system of claim 17, the processor further including a third processing unit, and the API being further configured to:
   launch an instantiation of the application on the third processing unit, the instantiation of the application to execute the first process to provide second application output information;
   determine if the second application output information matches the first application output information and the first API output information;
   identify the first processing unit as a failing processing unit when the first application output information does not match the second application output information and the second output information matches the first API output information; and
   identify the second processing unit as a failing processing unit when the first application output information matches the second application output information and the second application output information does not match the first API output information.

* * * * *